FTC-1?? XR 3,761,822

United States X5186T X5821W

Richardson et al.

[11] 3,761,822

[45] Sept. 25, 1973

[54] MULTIPLE RECEIVER SELECTION SYSTEM

[75] Inventors: John Bernard Richardson; Anthony Keith Sharpe, both of Cambridge, England

[73] Assignee: Pye Limited, Cambridge, England

[22] Filed: Feb. 2, 1971

[21] Appl. No.: 112,108

[30] Foreign Application Priority Data

Feb. 5, 1970 Great Britain .................... 5,517/70

[52] U.S. Cl. .......................................... 325/301
[51] Int. Cl. .......................................... H04b 1/06
[58] Field of Search .................... 325/52, 53, 54, 56, 325/65, 301, 304, 305, 306, 473, 474

[56] References Cited

UNITED STATES PATENTS

| | | | |
|---|---|---|---|
| 3,495,175 | 2/1970 | Munch | 325/304 X |
| 3,537,011 | 10/1970 | Escoula | 325/304 |
| 3,403,341 | 9/1968 | Munch | 325/56 X |

*Primary Examiner*—Robert L. Griffin
*Assistant Examiner*—Fay I. Konzem
*Attorney*—Frank R. Trifair

[57] ABSTRACT

The invention provides apparatus for selecting from a plurality of receiving stations, each station simultaneously receiving radio frequency signals containing identical information, the signal with the best signal-noise ratio. At each receiving station a control signal is generated, the frequency of which is determined by the signal-noise ratio of the radio signal received by that station. These signals are fed from the respective receiving stations to a central control which monitors the incoming control signals and selects the signal with the best signal-noise ratio.

4 Claims, 5 Drawing Figures best S/N ratio

PATENTED SEP 25 1973 3,761,822
SHEET 1 OF 4
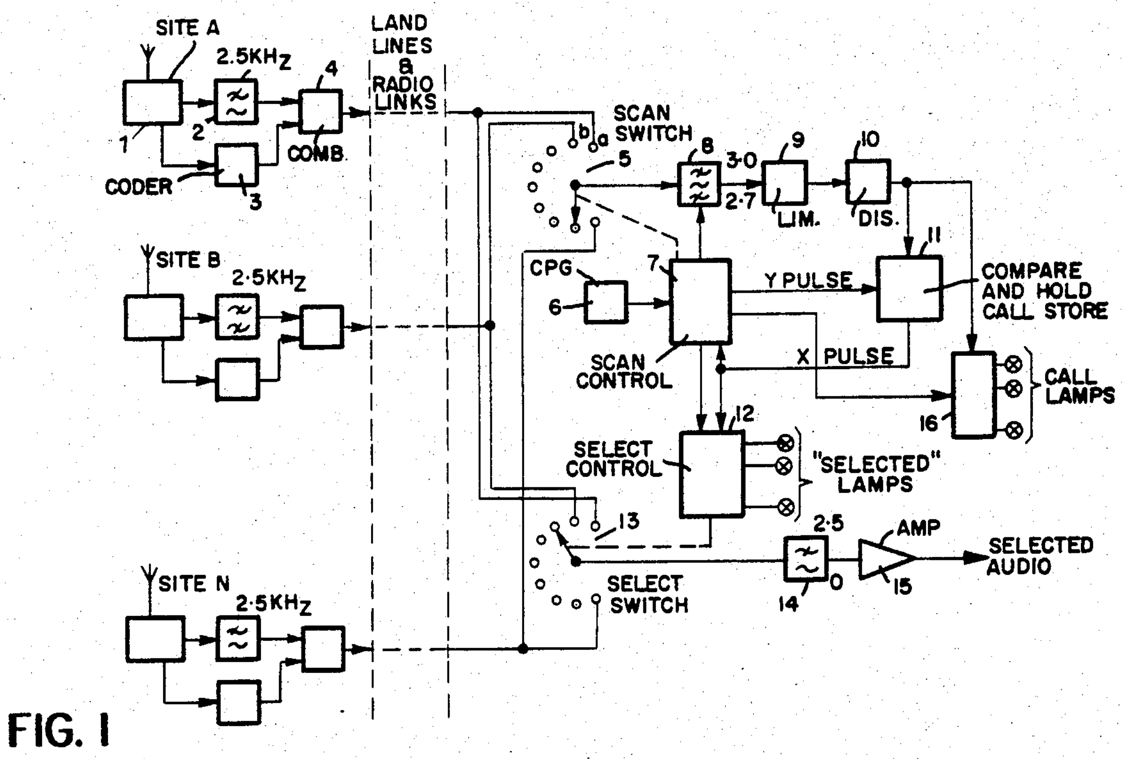
FIG. I
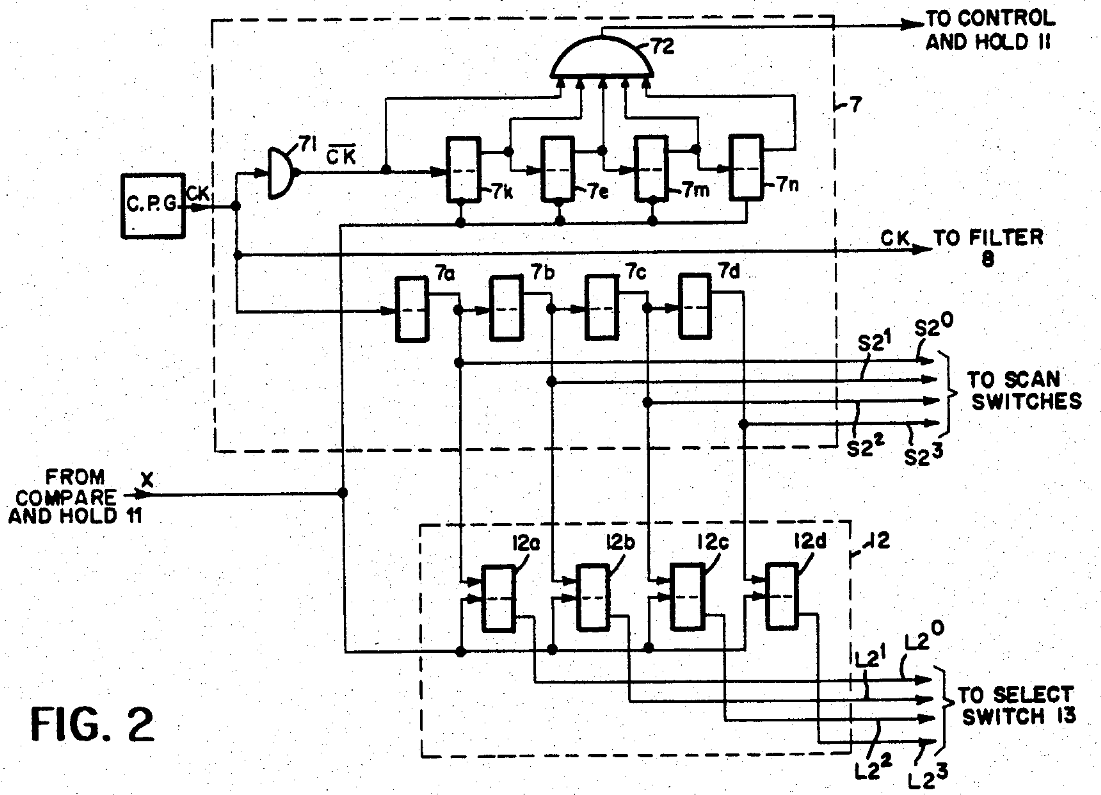
FIG. 2

MULTIPLE RECEIVER SELECTION SYSTEM

The present invention relates to signal receiving apparatus and relates more especially to apparatus for selecting from a plurality of receiving stations simultaneously receiving radio frequency signals containing identical information the received signal having the best quality.

In mobile radio telephony for example, the transmitter located in a vehicle has a limited range of radiowave propagation, since the power supply limitations of the vehicle preclude high power transmission. Also, physical obstructions and reflecting elements often block the propagation of radio waves in certain directions.

To ensure reliable communication between a central fixed station and a vehicle which may be located at any point within a wide area it is the practice to provide a plurality of receiving equipments placed at various locations throughout the area, such that an acceptable signal is received by at least one of the receiving equipments irrespective of the location of the vehicle. More commonly, signals will be simultaneously received at several of the receiver sites.

The outputs of the various receivers are connected to a central station, where apparatus is provided to monitor the outputs and to select for use that output providing for the time being the signal of best quality.

In the context of this invention the expression "received signal of best quality" is to be taken to mean the output signal from the receiver having the highest ratio of signal to noise.

It is the practice to provide at each receiver, apparatus to measure the signal/noise ratio of the received signal, and to produce a signal proportional to the signal/noise ratio which is transmitted to the central station together with the audio frequency output signal from the receiver. At the central station, the signals representing the signal/noise ratios of the various receivers are compared and the one representing the highest signal noise ratio is employed to cause selection apparatus to select the corresponding audio frequency output signal.

According to the present invention, in a radio telephony system wherein a plurality of receiving stations simultaneously receive radio frequency signals containing identical information, there is provided at each of the receiving stations oscillator means for generating a quality signal having a frequency which is dependent on the signal to noise ratio of the radio frequency signal received at that station and which is of a frequency higher than the highest frequency component of the audio frequency output of said station, together with means for combining said audio frequency output and said quality signal and means for transmitting said combined signal to a central station; which central station includes first switch means which selects in sequence each one of the combined signals from the various receiving stations, first filter means connected to the output of said first switch means responsive only to the quality component of the selected combined signal, comparison means connected to the output of said first filter means responsive to the quality components and adapted to determine the signal of highest quality, second switch means controllable by the comparison means and adapted to select from the combined signals from the various receiving stations the signal of highest quality and second filter means connected to the output of said second switch means responsive only to the audio frequency components of said selected highest quality signal.

The audio frequency output from each of the receiving stations occupies the frequency range up to 2.5KHz and the quality from each receiving station lies within the range of frequencies 2.7KHz to 3.0KHz. The combined signal may be transmitted from each receiving station to the central station by any means capable of carrying a range of frequencies up to 3.0KHz, e.g. by telephone land line, or by radio link.

In order that the invention and the manner in which it is to be performed may be more clearly understood, a specific embodiment will be described, by way of example, with reference to the attached drawings, in which:

FIG. 1 shows a block schematic diagram of a multiple receiver selection system according to the invention;

FIG. 2 shows a block schematic diagram of a scanning and selection control arrangement;

Figure 3:
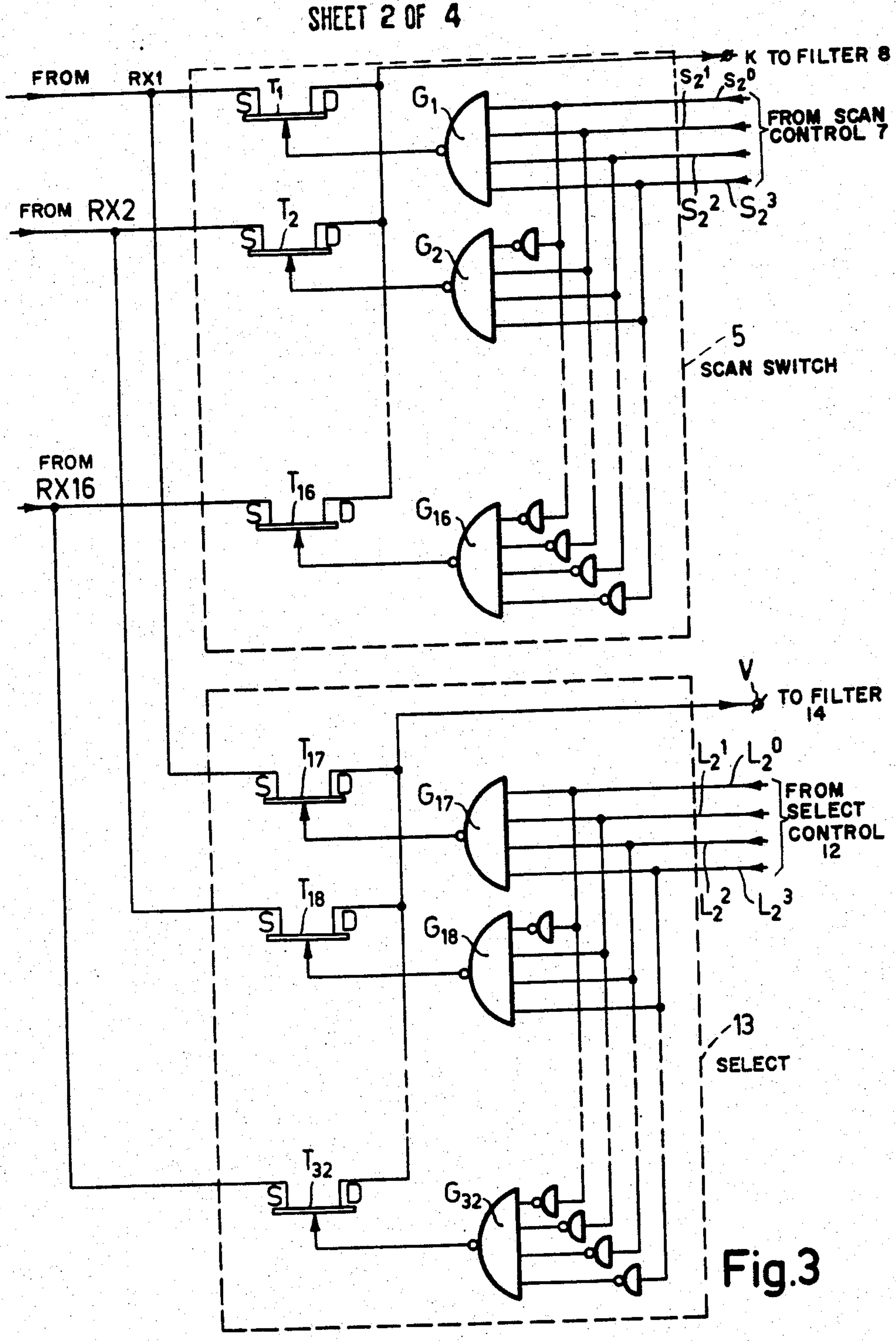
FIG. 3 shows a block schematic diagram of a scanning and selection switching arrangement.

Referring first to FIG. 1, a number n of receiving equipments are provided, one at each of receiving sites A to N, of which the first two and the last are shown. Since similar equipments are provided at each site, only that at site A will be described, the description being understood to be equally applicable to the equipments at the remaining sites B to N.

The received radio frequency signal is amplified and detected in a receiver 1, the audio content of the signal being fed to low pass filter 2 having a cut-off frequency of 2.5KHz. Circuits in receiver 1 produce a current dependent on the quality, i.e. the signal to noise ratio of the R.F. signal, the value of the current ranging from say 600 microamperes for a high value of signal/noise ratio down to say 200 microamperes for a signal/noise ratio so low as to correspond to a barely intelligible audio signal.

The current is fed to the input of a coder unit 3 via a squelch circuit in receiver 1, so that no current can reach coder 3 when no R.F. signal is being received, or when the received signal is less than the squelch threshold.

Coder unit 3 comprises a variable frequency oscillator so arranged as to produce no output when no current reaches its input and to produce an output of frequency in the range 2.7KHz to 3.0KHz when the input current lies in the range 200$\mu$A to 600$\mu$A. The frequency of the output signal from unit 3 is thus proportional to the signal to noise ratio of the R.F signal being received, and is always higher than the highest frequency passed by filter 2.

The output signals from units 2 and 3 are combined in unit 4 whose output, when a signal is being received, contains an component with frequencies in the range up to 2.5KHz plus a quality component comprising a single frequency in the range 2.7KHz to 3.0KHz. If no signal is received, combining unit 4 gives no output.

The output from unit 4 is transmitted to the central station by land line or radio link.

At the central station, the lines from each of the *n* receiving sites are connected in sequence to the fixed contacts of two n-way rotary switches 5 and 13.

A clock pulse generator 6 produces a continuous train of pulses of constant repetition rate which is fed to the input of a scan control unit 7. Unit 7 produces a corresponding train of impulses which energise the drive mechanism of switch 5, causing the moving contact to advance one position for each impulse applied. Switch 5, known as the scan switch, connects each of the $n$ lines from the receiving sites in sequence to the input of a band-pass filter 8, dwelling on each line for the interval between successive scanning impulses.

Filter 8 has a pass-band extending from 2.7KHz to 3.0KHz. It therefore rejects the audio component of the signal present on the line being scanned but accepts the quality component. To prevent spurious frequencies being caused by switching transients shock exciting filter 8 when switch 5 advances a step, provision is made to lower the Q of the filter at times coincident with each stepping impulse produced by scan control unit 7. This may be done, for example, by providing one or more circuits comprising a resistor and a transistor in series connected across suitable points in the filter. The transistors are normally biassed beyond cut-off so that the resistors are effectively open circuited and have no effect on the filter. Coincident with each stepping impulse, scan control unit 7 provides a pulse which renders the transistors conductive, so that for the duration of each pulse the resistors load the filter and reduce its Q.

The output of filter 8 comprises the quality component of each of the signals from the n receiving sites each component being delivered in turn as switch 5 scans the lines from the various sites. The output is connected, via an amplitude limiting circuit 9 to the input of a frequency discriminator unit 10. Unit 10 provides a unidirectional voltage output of magnitude proportional to the frequency of its input signal. During a scanning cycle of switch 5, therefore, the output of unit 10 comprises a series of $n$ voltage levels, each level corresponding to the signal to noise ratio of the signal being received at one of the sites A to N. If no signal is received at a particular site, no quality signal is generated at that site and the corresponding output level of unit 10 is zero. For sites where signals are received, the output levels will lie between a value Vmax corresponding to a high S/N ratio and a value Vmin corresponding to the minimum usable S/N ratio.

It should be noted that Vmin is never equal to zero. As will be seen, use is made of this fact to provide an indication of the sites actually receiving a signal at any time.

The output of discriminator 10 is fed to a "compare and hold" unit 11. This consists essentially of a capacitive store arranged to be charged to the potential of an applied signal and to hold its charge when the applied signal voltage is reduced. In the course of one scan of switch 5, the store will become charged to the highest level of the output of discriminator 10, i.e. to the level corresponding to the signal to noise ratio of the receiver providing for the time being the best signal and will hold that level.

Assume that one receiver, say F, is providing a signal of substantially better quality than any other receiver. At a step $f$ of a first scan, the output of discriminator 10 will have a value $V_f$ which is greater than its value of any other step of that scan. Accordingly the store will be charged to and will hold the level $V_f$.

On a subsequent scan it may happen that although receiver F still provides the best signal, its signal to noise ratio is less and the output of unit 10 at step F of this subsequent scan of a value $V_f^1 < V_f$.

The store is updated from one scan to the next by arranging that if it becomes charged during a particular step of one scan, it is discharged immediately prior to the corresponding step of the next scan. Thus, in the example cited, the store will be charged to a value $V_f$ during step $f$ of a first scan. During the next scan it will be discharged in the interval between step $(f-1)$ and step $f$. It will then be charged to the value $V_f^1$ during step $f$ of this second scan. In this manner compare and hold unit 11 is enabled to follow variations in the noise/signal ratio of the best signal. Timing signals to discharge the store are provided by scan control unit 7 in a manner described below in detail.

Compare and hold unit 11 is arranged to provide an output pulse each time its store is charged. Continuing the example above, while receiver F continues to provide the best signal, unit 11 will give an output pulse during step $f$ of each scanning cycle. Eventually another receiver will give a better signal than does receiver F. The store will then be charged to the level corresponding to this new receiver, say receiver B, and will give an output pulse on step b of each scanning cycle during which receiver B produces the best signal.

The output signals from unit 11 are fed to an input of a selection switch control unit 12, which also receives an input from scan control unit 7. Unit 12 controls the position of receiver selector switch 13 and is arranged to set switch 13 to a position corresponding to that of switch 5 at the instant that an output pulse is received from unit 11. For example, while receiver F provides the best signal, switch 13 will be set to position $f$, but when receiver B commences to provide a better signal, switch 13 will be reset to position $b$. Switch 13 therefore selects the combined (audio and quality) output of the receiver which is set at any time providing the best signal.

The combined signal selected by switch 13 is fed to a low pass filter unit 14 having a cut-off frequency of 2.5KHz. Filter 14 rejects the quality components of the signal, but passes the audio component, which after amplification in unit 15 is passed on to user circuits (not shown).

A call store unit 16 provides means of indicating those receivers which are at any time receiving signals. Unit 16 comprises an assembly of $n$ resettable monostable store units, one corresponding to each one of receivers A to N, together with a switching matrix.

Each store comprises a monostable circuit so arranged that it is changed from a first to a second state by a first triggering impulse. If no further triggering impulses are received, the monostable reverts to the first state after a time interval $t$. If however a further pulse is received before the expiry of interval $t$, the monostable is reset in the second state and reverts to the first state at an instant delayed by interval $t$ after the further pulse. Thus, if a train of pulses having a time separation less than $t$ is applied, the monostable circuit will remain in the second condition. Component values are selected such that the time $t$ is somewhat greater than period of one scanning cycle. A lamp is connected to each store and is lit when the store is in the second state.

As previously stated, if an RF signal is present at a particular receiver, the discriminator output will be at least Vmin when that receiver output is scanned, whereas if no RF signal is present the discriminator output will be zero. The output from discriminator 10 is connected to the input of unit 16 and is directed by the switching matrix to the trigger input of each of the stores in turn. Driving signals for the switching matrix are provided by scan control unit 7.

Therefore, all stores corresponding to receivers at which an RF signal is present are triggered once per scanning cycle. These stores are held in the second condition and the corresponding lamps are lit. If the RF signal disappears from a particular receiver, triggering of the corresponding store ceases, the store reverts to its first condition and the associated lamp is extinguished. In order to indicate the particular receiver selected at any time, a further array of n lamps is provided in association with selection controller 12. Controller 12 is arranged to illuminate the lamp corresponding to the selected receiver.

For greater simplicity switches 5 and 13 have been illustrated in FIG. 1 as rotary switches. Use of mechanical switches is perfectly feasible. Switch 5 could be a single-bank *n*-way switch arranged for continuous rotation by a stepping motor or a solenoid and ratchet drive fed with impulses from scan control unit 7. Switch 13 could be a similar switch provided with an auxiliary bank of homing contacts, any one of which could be supplied with a marking signal be selection control unit 12, the switch being arranged to home on the marked contact.

Preferably however, solid-state switching devices are employed to perform the functions of switches 5 and 13, giving the advantages of reduced switching time, absence of wear and smaller size. The solid state devices may be combined to form integrated circuits.

Elements of the system will now be described in more detail.

The embodiment to be described with respect to FIGS. 2–5 provides means for selecting the best signal from those received by any number of receivers not greater than 16. A scanning cycle therefore contains 16 steps and both the scanning switch and the selection switch are 16–way devices.

Referring first to FIG. 2, the clock pulse generator 6 may conveniently comprise a multivibrator producing a continuous train of pulses of constant repetition rate, the clock waveform CK.

The scan control unit 7 is shown schematically in the dotted rectangle 7. Clock waveform CK is fed to the input of a four-stage binary counter comprising bistable circuits 7*a*, 7*b*, 7*c* and 7*d*. Output wavesforms $S2^0$, $S2^1$, $S2^2$, and $S2^3$ from the successive stages are fed to the scan switch unit 5. It is apparent that this group of waveforms considered as a whole will repeat after 16 clock pulses.

Clock waveform $\overline{CK}$ is inverted in gate 71 and the inverted waveform CK is fed to the input of a further four stage binary counter comprising bistable circuits 7*k*, 71, 7*m* and 7*n*. Output signals from these stages are connected respectively to inputs 1 to 4 of a five-input AND gate 72. The inverse clock waveform CK is applied to the fifth input of gate 72. Starting with the counter set to zero, gate 72 provides an output pulse (Y pulse) at the 16th clock pulse. The reset terminals of stages 7*k*, 71, 7*m* and 7*n* are connected together and are fed with a pulse X, generated by the output of the compare and hold circuit 11. This X pulse is generated when circuit 11 is charged to the level corresponding to the best signal, and has the effect of resetting all of stages 7*k* to 7*n* to the zero count condition. Thus when the store of compare and hold circuit 11 is charged at a particular step of one scanning cycle, the counter is reset, and produces a Y pulse output from gate 72 at the commencement of the corresponding step of the following scanning cycle. The Y pulse output is fed to unit 11 where it is employed, as will be described in detail below, to discharge the store. The store is then recharged during the remainder of the step.

The selection control unit is shown within dotted rectangle 12 and comprises a group of four bistable circuits 12*a*, 12*b*, 12*c* and 12*d*. These are employed as a register. Their read inputs are connected together and are fed with pulse X from compare and hold circuit 11. The $S2^0$, $S2^1$, $S2^2$ and $S2^3$ waveforms from scan control 7 are applied respectively to the signal inputs of stages 12*a*, 12*b*, 12*c* and 12*d*. These stages are therefore set to the instantaneous state of their input waveforms each time an X pulse occurs, i.e. at the step in each scanning cycle when the store of compare and hold unit 11 is charged to the level corresponding to the best received signal. Output $Ls^0$, $L2^1$, $L2^2$ and $L2^3$ from stages 12*a*, 12*b*, 12*c* and 12*d* respectively are fed to selection switch 13.

Turning now to FIG. 3, the scan switch 5 is shown in the dotted rectangle 5 and comprises a 1 in 16 decode matrix. This consists essentially of an array of 16 four-input AND gates G1 to G16. By feeding to the inputs of the respective gates combinations of the waveforms $S2^0$, $S2^1$, $S2^3$ and $S2^4$ and of the inverse of these waveforms, in the manner shown schematically with respect to gates G1, G2 and G16, each of the interval between successive clock pulses, the sequence being repeated every 16 clock pulses.

Associated with each of the gates G1 – G16 is a field effect transistor (T1 to T16), the output of each gate being connected to the gate electrode of the corresponding transistor. Potentials are arranged so that when any gate gives an output pulse, the associated transistor is conductive whereas when the gate gives no output the transistor is cut off.

The 16 lines carrying the combined signals from the receivers Rx1 – Rx16 are connected in sequence to the source electrodes of transistors T1 to T16. The drain electrodes of T1 – T16 are connected together and to the input of filter 8. Thus, in each scanning cycle, each of receivers R×1 to R×16 is connected in turn to the input of filter 8 for a period equal to the interval between two successive clock pulses.

The selection switch is shown within dotted rectangle 13 and is similar to scan switch 5. It comprises a 1 in 16 decode matrix including four-input AND gates G17 to G32 and associated field effect transistors T17 to T32.

The signal lines from the various receivers are connected in sequence to the source electrodes of T17 to T32. All drain electrodes are connected together and to the input of filter 14.

The decode matrix is fed with the L2 waveforms produced by selection control unit 12. As previously explained, the L2 waveforms have the same values as did the S2 waveforms during that step of the scanning cycle corresponding to the receiver producing the best signal and retain these values until another receiver produces a better signal, i.e. until the X pulse moves to a different step of the scanning cycle. It follows therefore that one gate of the decode matrix of switch 13 produces a continuous output so long as a given receiver provides the best signal, and that this gate is the one corresponding to this receiver. Thus the receiver giving the best signal is connected to the input of filter 14.

Figure 4:
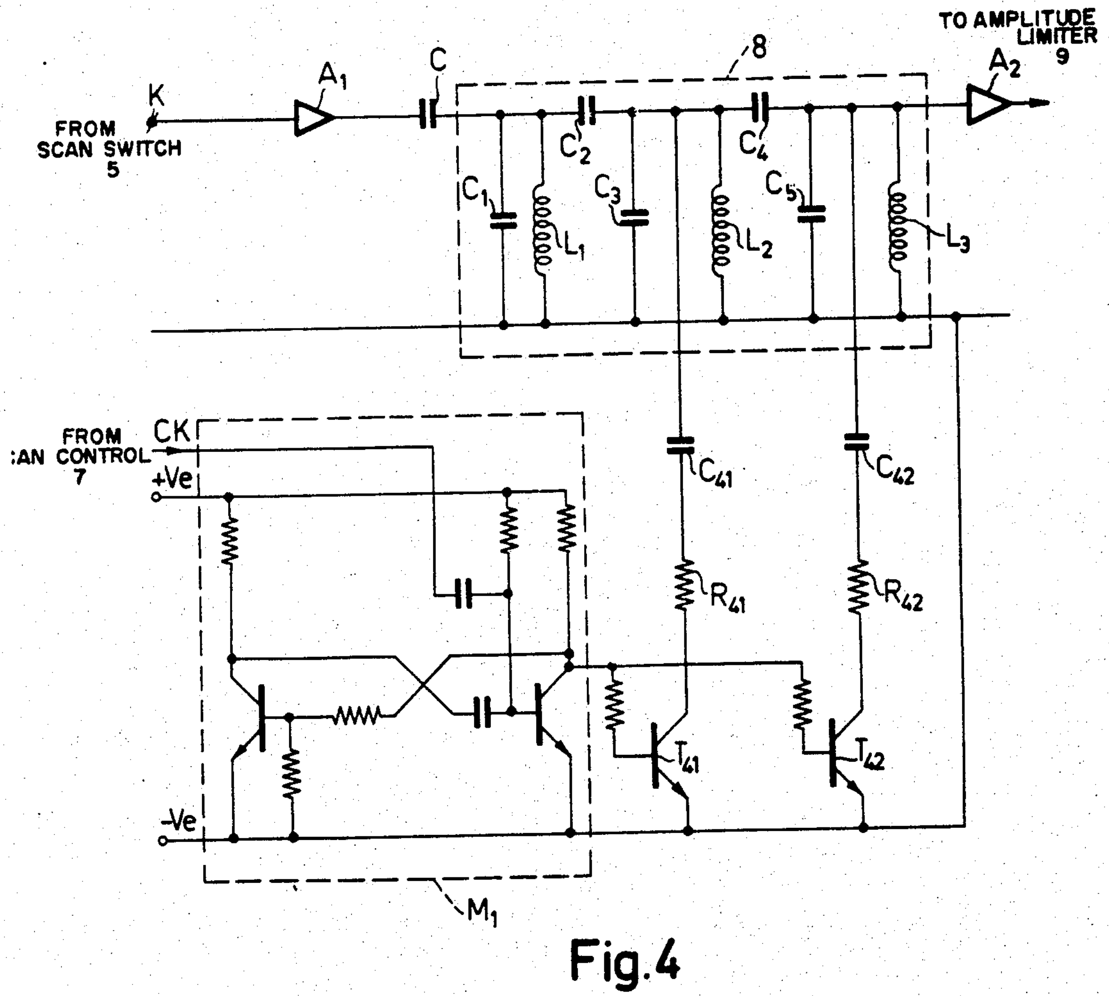
FIG. 4 shows a circuit diagram of a variable Q band pass filter.

Referring now to FIG. 4, capacitors C1 – C5 and inductors L1 – L3 comprise band-pass filter 8. The combined signal from scan switch 5 is fed to amplifier A1 and thence through a blocking capacitor C to the input of filter 8. Amplifier A1 is arranged to have an output impedance equal to the input impedance of filter 8. As previously stated, the filter has a pass-band from 2.7KHz to 3.0KHz. The audio content of the combined signal is therefore rejected by filter 8, but the quality component is selected by the filter and fed to the input of amplifier A2. After amplification, the quality component is passed to amplitude limiter 9 and discriminator 10.

The edges of the switching pulses applied to transistors T1 to T16 in scan switch 5 have rapid rise and fall times. Transient signals corresponding to these edges are passed by amplifier A1, and tend to shock — excite the circuits of filter 8, which are of relatively high Q. Such shock — excitation would generate frequencies in the pass band of the filter which would be effective to operate the discriminator and produce a false output.

To prevent this occurring there is provided a monostable circuit M1 (dotted lines) which is triggered by the clock waveform CK to produce a train of output pulses. The leading edge of each pulse is coincident with the edge of the S2 waveform which is fed to scanning switch 5 to generate a switching pulse. It will be appreciated that there is some slight delay in the decoding matrix of switch 5 and that the transient signal generated by the switching pulse is further delayed in its passage through amplifier A1. Consequently, the leading edge of each pulse from monostable M1 occurs shortly before the corresponding transient reaches the input of filter 8. The time constant of M1 is chosen so that the trailing edge of each pulse occurs after the cessation of the corresponding switching transient.

The output pulses from monostable M1 are applied to the base electrodes of transistors T41 and T42. The collector electrode of T41 is connected via resistor R41 and d.c. blocking capacitor C41 to the junction of C2 and C3 in filter 8, and the collector electrode of T42 is connected via resistor R42 and blocking capacitor C42 to the output terminal of filter 8. The emitter electrodes of both T41 and T42 are connected to the negative supply rail.

Transistors T41 and T42 are normally cut-off, so that resistors R41 and R 42 are open circuited and have no effect on filter 8. When monostable M1 delivers an output pulse, T41 and T42 are driven to the fully conductive condition, so connecting R41 and R42 to the negative supply rail, i.e. across filter 8. The values of R41 and R42 are chosen to provide critical damping to the tuned circuits of filter 8 so that the said circuits are unable to 'ring' when shock-excited by the switching transients.

A consequence of the damping is that when switch 5 first connects a particular receiver to the input of filter 8, the output signal from the filter is initially of small amplitude, increasing to its full amplitude as the damping is removed. Similarly, the amplitude is again reduced to a low level towards the end of the period during which that receiver is connected to the filter as the damping is re-applied prior to the next switching step.

For the proper functioning of the frequency discriminator 10 it is necessary that the applied signal be of constant amplitude. The output of filter 8 is fed to the discriminator via a limiting amplifier 9, which ensures that the signal is of constant amplitude during the periods when no damping is applied to the filter.

To ensure that its output is not affected by the amplitude variations at the beginning and end of the signal associated with each of the receivers, clock waveform Ck is employed to gate discriminator 10. Each cycle of waveform CK comprises a first negative-going portion and a second positive- going portion, the leading edge of the first portion providing the actual timing signal which advances the scanning switch and which applies damping to filter 8. It is arranged that discriminator 10 is cut off by the negative-going portion of waveform CK and that the duration of this portion is such that the distrubance to the input signal has subsided before the discriminator becomes operative.

The discriminator proper may comprise one of several arrangements well known to those skilled in the art and need not be described in detail. The output of the discriminator comprises a series of pulses, the maximum amplitude of each pulse being proportional to the quality of the RF signal at the corresponding receiver. In general each of these pulses will not be of constant amplitude throughout its duration, but will rise from a comparatively low initial value to a final value over a period, since, for each step of the scanning cycle, several cycles of the quality signal are necessary before the discriminator output reaches its final value.

A second series of pulses, known herein as P pulses, are derived from the discriminator, These P pulses are of the same duration as the output pulses proper, but of constant amplitude. They may be produced, for example by applying the discriminator output pulses to a high-gain amplifier and limiter. It will be apparent that on each scanning cycle, for each receiver having an RF signal present, there is produced a discriminator output pulse of amplitude proportional to the quality of the said RF signal and a P pulse of fixed amplitude. For each receiver not receiving an RF signal, no discriminator output pulse and no P pulse will be generated.

The output signal from discriminator 10 is fed to the input of compare and hold circuit 11. Also fed to circuit 11 is the pulse train P.

Figure 5:
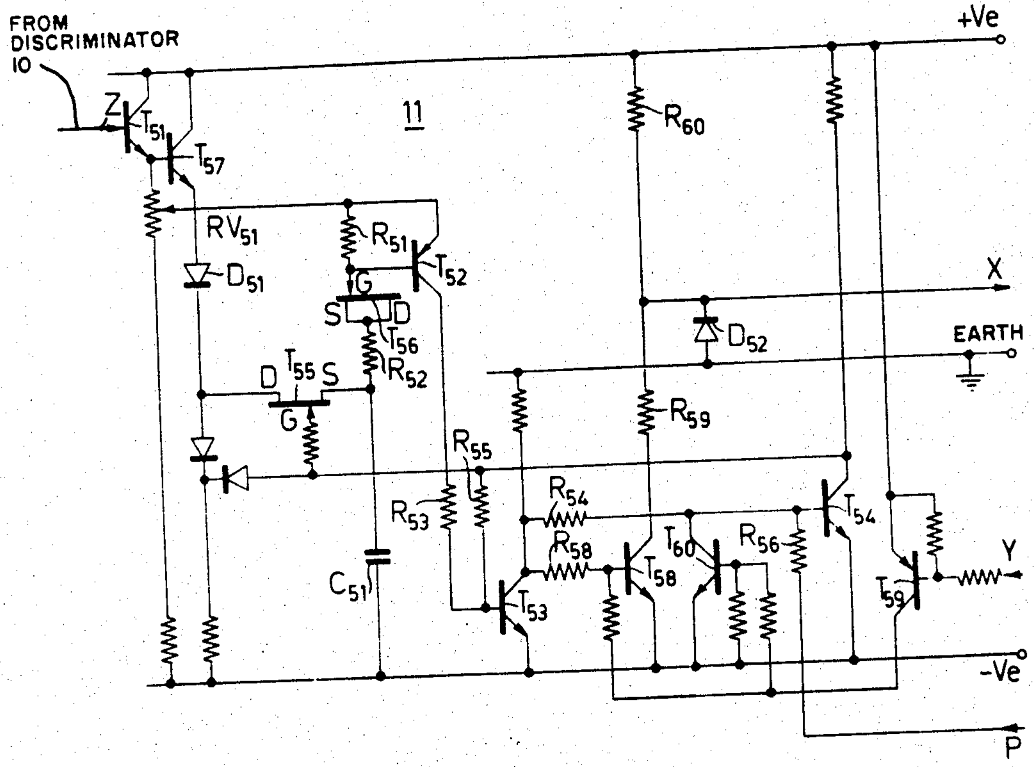
FIG. 5 shows a circuit diagram of a compare and hold circuit employed in the arrangement of FIG. 1.

Compare and hold circuit 11 is illustrated in FIG. 5. The function of this circuit is to charge a capacitor C51 to the highest output level attained by discriminator 10 on any step on a scanning cycle and to produce an output pulse (X pulse) during the step on which C51 is charged.

The positive going signals from discriminator 10 are applied to the base of emitter follower T51. When discriminator 10 is gated off, i.e. immediately prior to an output pulse, its output will be zero, hence T51 emitter potential will be low. T52 will be cut off as will T53. The collector of T53 will be substantially at earth potential and therefore T54 will be conducting. The potential of T54 collector will approach that of the negative supply rail. This potential will be applied to the gate electrode of field effect transistor T55, which will therefore be cut off. Any charge previously stored on C51 will be unable to discharge via T55, and will remain.

When a discriminator output pulse is applied to the base of T51 the potential at the slider of potentiometer RV 51 rises to a value V which is lower than the discriminator output by an amount dependent on the setting of RV 51 plus the base-emitter drop of T51. If this potential V is higher than the potential stored on C51, current flows into C51 via R51, T56 (connected as a diode) and R52. A voltage drop occurs across R51 so that the base of T52 is now negative with respect to its emitter electrode. T52 therefore draws current through R53 and the base-emitter junction of T53 causing T53 to conduct and its collector also to move in a negative direction. The collector of T53 is connected via R54 to the base of T54. A negative going P pulse from the discriminator is applied via R56 to the base of T54. The combined effect of the P pulse and the negative signal at T53 collector is to cut off T54. T54 collector potential rises towards that of the drain electrode of T55, causing T55 to conduct and allowing C51 to be charged via T51, T57, D51, and T55 to a potential just below that of the discriminator output.

In addition the collector of T54 is coupled back to the base of T53 via R55, the current through this resistor holding T53 "on", although the current through R53 falls as C51 becomes charged.

T54 remains cut off until the end of the negative-going P pulse, when it will again conduct, taking the gate electrode of T55 and the base electrode of T53 negative. T55 and T53 are thus cut off. Hence the charge on C51 is unable to escape via T55 when the discriminator output falls at the end of the output pulse.

The base of T58 is conected via R58 to the collector of T53. When T53 is cut off, its collector is substantially at earth potential, and current flows through R58 to cause T58 to conduct. The potential at the junction of R59 and R60 is caught at earth potential by diode D52.

When T53 conducts, T58 is cut off, and the potential at the junction of R59 and R60 rises toward the positive supply rail. The resulting positive going pulse comprises the output signal (X signal) from the compare and hold circuit, and as previously described is fed to the selection control circuit 12 and to the scan control circuit 7.

In the scan control unit, the X pulse, as previously described, is employed to reset a counter which provides an output (Y) pulse sixteen scan steps after the X pulse, i.e. at the beginning of that scan step of the next scanning cycle corresponding to that during which the X pulse was generated. This Y pulse is returned to the compare and hold circuit and applied, via transistor T59 to the base of transistor T60 whose collector is connected to the base of T54 and to the base of T58.

The Y pulse causes T59 and hence T58 and T60 to conduct. Conduction of T58 prevents the formation of an X pulse, while that of T60 cuts off T54, causing T55 to conduct and discharge C51.

The duration of the Y pulse is equal to that of the first portion of a clock waveform cycle, during which portion discriminator 10 is gated off. The Y pulse has therefore terminated prior to the arrival of the next output pulse from the discriminator, and C51 is recharged to the level corresponding to the instantaneous value of the RF signal quality at the selected receiver, which value may be either higher or lower than on the previous scanning cycle.

Suppose that after a first receiver has been giving the best signal, a second receiver commences to give a better signal. C51 will have been charged on the step of the scanning cycle corresponding to the first receiver to a value equal to the discriminator output minus the voltage drops across T51, T57 and D51.

If, on the step corresponding to the second receiver, the potential at the slider of RV51 exceeds the potential on C51, C51 will be further charged to the value of the discriminator output for the second receiver, and an X pulse will be generated corresponding to this receiver, discriminator output for the second receiver minus the voltage drop across T51 and the voltage drop across the upper part of RV51, which may be controlled by adjusting the position of RV51 slider.

Therefore the discriminator output for the second receiver must exceed that for the first receiver by an amount controllable by adjustment of RV51 before the second receiver is selected. This prevents unnecessary changes of the selected receiver when two or more receivers are receiving signals of substantially equal signal to noise ratio. RV51 may be set so that a change is made only when the signal to noise ratio of a second receiver exceeds that of a first selected receiver by an amount exceeding the random fluctuations in signal to noise ratio which occur from one scanning cycle to another.

It will be noted that field effect transistor T56 is connected as a diode. It is preferred to employ a field effect transistor in this location because of its extremely high leakage resistance, which is substantially greater than that of a conventional diode, and which minimises loss of charge from C51.

The remaining circuits employed in this embodiment are well-known and need not be described in detail. Call store unit 16 may incorporate a 1 in 16 decode matrix similar to those described with reference to FIG. 3 in order to route the discriminator output to the appropriate stores. Similarly an additional decode matrix in selection control unit 12 may be employed to illuminate the lamp corresponding to the selected receiver.

The particular form of decode matrix illustrated in FIG. 3 is available as an integrated circuit incorporating inverters and requiring only normal inputs from the counter stages of units 7 and 12. It will be appreciated that a decode matrix without inverters and provide with both normal and inverse inputs could be employed.

For the various receiving sites, a circuit suitable for deriving a current proportional to the signal to noise ratio of the received signal is described in our British patent specification No. 1,147,605. A variable frequency oscillator can be used to produce an output frequency dependent on such a current.

Where a greater number of receiving sites is involved, it is possible to employ a plurality of selection systems of the form described in combination.

The receiving sites are divided into groups, each group comprising a number of sites within the capacity of one system (i.e. not greater than 16 in the present instance). At the central station, a selection system is provided for each group, these systems being of the form described except that the low pass filter 14 is omitted. The output signals from these systems, which signals each contain the quality component from site selected in its particular group, are fed to the inputs of a further selection system, which therefore selects the best signal from the total number of receiving sites.

What is claimed

1. Apparatus for selecting the highest quality signal from a plurality of incoming identical signals, comprising input means for separately receiving said signal, means for providing each signal with an additional modulated carrier wave component related to the quality thereof, the frequencies of the quality signal component lying outside the frequency band of the received signal, first switching means for selecting said signals from said input means in sequence during successive scanning cycles, signal processing means for providing voltages representing the quality components of signals from said first switching means, control means for producing pulses from the highest voltage of said signal processing means during each scanning cycle, said control means comprising storage means for receiving the voltages from said signal processing means to produce pulses for voltage increases during each scanning cycle, generating means for producing continuous clock pulses, the time interval of each switching sequence being equal to the time interval between the clock pulses, scan control means to drive said first switching means in response to clock pulses from said generating means and produce pulses for discharging said storage means in response to said clock pulses and the pulses from said storage means, said scan control means comprising input means for receiving said clock pulses, a first binary counter connected to said input means for driving said first switching means, a gate connected to said input means for inverting said clock pulses, a second binary counter for receiving the output of said gate, an AND gate for receiving the outputs of said gate and said second binary counter to produce an output pulse for discharging said storage means at a time interval after the output pulse of said storage means equal to said scanning cycle, said second binary counters being reset by the output pulse of said storage means, the time interval between the initiation of the pulses from said storage means and the pulses from said scan control means being equal to the time interval of said cycle, and selection control means to drive said second switching means in response to the pulses of said storage means and said scan control means, said pulses corresponding with signals having the highest quality components, second switching means for selecting the highest quality signals from said input means during successive scanning cycles in response to the pulses of said control means, and filter means for passing said signals having no quality components from said second switching means.

2. Apparatus as claimed in claim 1 wherein said signal processing means comprises a first filter means for passing quality components of each signal from said first switching means, said first filter means comprising a first amplifying means, a blocking capacitor, a plurality of parallel, capacitively coupled resonant circuits, second amplifying means, and means for lowering the Q of said resonant circuit at times controlled by said clock pulses and discriminating means for providing voltage representing the quality components of each signal from said first filter means.

3. Apparatus as claimed in claim 1 wherein said storage means comprises means for charging a capacitor during sequence in said scanning cycle when the voltage of said signal processing means is higher than the voltage on said capacitor in the presence of a constant amplitude replica of said voltage of said signal processing means, means for maintaining the voltage of said capacitor constant when said constant amplitude replica of said signal processing means is absent, means for producing a pulse during the sequence of said scanning cycle when said capacitor is charging, and means for discharging said capacitor in response to pulses from said scan control means.

4. Apparatus as claimed in claim 2 wherein said means for lowering the Q of said first filter means comprise a monostable circuit triggered by said clock pulses to produce a train of pulses, and transistor switching devices positioned between the coupling of said parallel resonant circuits and responsive to said train of pulses to provide critical damping to said resonant circuits prior to the arrival of said quality components of said signals.

* * * * *